(12) United States Patent
Puthawala

(10) Patent No.: US 6,968,028 B1
(45) Date of Patent: Nov. 22, 2005

(54) NUCLEAR POWER STATION HAVING A GAS-INJECTION DEVICE FOR A COOLANT

(75) Inventor: Anwer Puthawala, Buckenhof (DE)

(73) Assignee: Framatome ANP GmbH, Erlangen (DE)

( * ) Notice: Subject to any disclaimer, the term of this patent is extended or adjusted under 35 U.S.C. 154(b) by 254 days.

(21) Appl. No.: 09/661,507

(22) Filed: Sep. 13, 2000

Related U.S. Application Data

(63) Continuation of application No. PCT/DE99/00541, filed on Mar. 1, 1999.

(30) Foreign Application Priority Data

Mar. 13, 1998 (DE) .......................................... 198 10 963

(51) Int. Cl.⁷ ................................................. G21C 1/01
(52) U.S. Cl. ....................................... 376/306; 376/305
(58) Field of Search ................................. 376/305, 306

(56) References Cited

U.S. PATENT DOCUMENTS

| | | | | |
|---|---|---|---|---|
| 4,894,202 A | * | 1/1990 | Nagase et al. ............... | 376/306 |
| 5,398,269 A | | 3/1995 | Nagase et al. ............... | 376/306 |
| 5,467,375 A | | 11/1995 | Sasaki ......................... | 370/306 |
| 5,796,799 A | * | 8/1998 | Kobayashi et al. .......... | 376/306 |
| 6,056,858 A | * | 5/2000 | Puthawala ................... | 204/258 |

FOREIGN PATENT DOCUMENTS

| | | | |
|---|---|---|---|
| DE | 29 48 297 A1 | 6/1981 | |
| DE | 28 28 153 C3 | 7/1984 | |
| DE | 31 05 168 C2 | 11/1984 | |
| DE | 195 36 450 C1 | 11/1996 | |
| DE | 196 02 213 A1 | 7/1997 | |
| EP | 0 426 453 A2 | 5/1991 | |
| JP | 62-150 198 | 4/1987 | |
| JP | 08-122491 | * 5/1996 | .................. 376/306 |
| SE | 461 818 | 3/1990 | |
| WO | 97/36827 | * 10/1997 | .................. 204/258 |

* cited by examiner

Primary Examiner—Jack Keith
(74) Attorney, Agent, or Firm—Laurence A. Greenberg; Werner H. Stemer; Ralph E. Locher

(57) ABSTRACT

A nuclear power station includes a feedwater/steam circuit having a condensate-purification device and a feedwater pump connected upstream of a reactor pressure vessel. A branch line has a gas-injection device for introducing hydrogen into a coolant to ensure especially low maintenance and repair costs of the gas-injection device and an especially homogeneous distribution of hydrogen produced in the gas-injection device. The branch line branches off from the feedwater/steam circuit directly downstream of the condensate-purification device and discharges into the feedwater/steam circuit directly upstream of the feedwater pump.

13 Claims, 1 Drawing Sheet

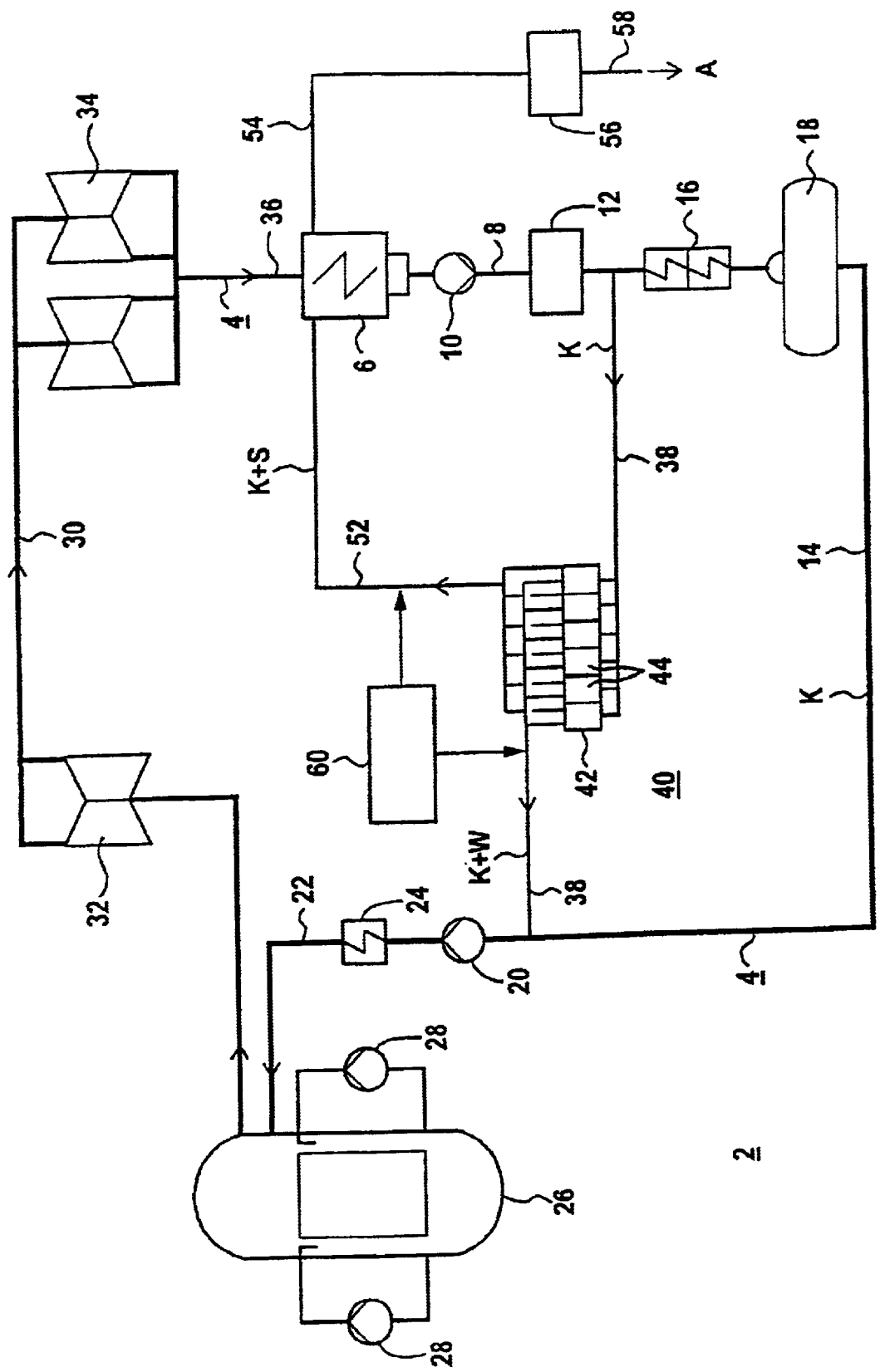

NUCLEAR POWER STATION HAVING A GAS-INJECTION DEVICE FOR A COOLANT

CROSS-REFERENCE TO RELATED APPLICATION

This application is a continuation of copending International Application No. PCT/DE99/00541, filed Mar. 1, 1999, which designated the United States.

BACKGROUND OF THE INVENTION

Field of the Invention

The invention relates to a nuclear power station having a gas-injection device intended for a coolant.

A feedwater/steam circuit is normally provided in a nuclear power station. The feedwater/steam circuit can serve as a cooling circuit for cooling a reactor core. In that case, a coolant provided in the cooling circuit depends on the type of reactor and can be water, in particular in a pressurized-water reactor or boiling-water reactor.

Provision is normally made for the introduction of hydrogen into the coolant in order to counter a radiolytic decomposition of the coolant flowing in the feedwater/steam circuit. For that purpose, a volume-control system for a pressurized-water reactor has been disclosed, for example, by a book entitled "VGB-Kernkraftwerks-Seminar 1970" [VGB Nuclear Power Seminar 1970], in particular on page 41. That volume-control system is suitable for feeding chemicals, in particular hydrogen, into the feedwater/steam circuit of the nuclear reactor.

In the known system, the hydrogen is fed into a volume-compensating tank belonging to the volume-control system. The hydrogen fed in to the volume-compensating tank is present as a constituent of a gas cushion above a liquid level of the coolant. In that case, the hydrogen partial pressure in the gas cushion is set in accordance with the desired concentration of the hydrogen in the cooling medium.

A further development of the system described above has been disclosed by German Published, Non-Prosecuted Patent Application DE 196 02 213 A1, corresponding to U.S. application Ser. No. 09/050,651, filed Mar. 30, 1998. In the feed system described in that publication, the hydrogen is introduced into the coolant by a hydrogen generator disposed in the feedwater/steam circuit. In that case, the hydrogen generator is an electrolytic device, as disclosed, for example, in a book entitled "Die Grundlagen der Ingenieurwissenschaften" [The Fundamentals of the Engineering Sciences] by Hutte, Springer (1996), pages B167 and the following.

Furthermore, German Patent DE 195 36 450 C1 discloses a nuclear reactor, during the operation of which hydrogen is added to the coolant. In that case, the addition of hydrogen depends on the hydrogen content of the coolant, which is continuously measured through the use of a measuring device on the pressure side of a high-pressure pump.

However, those systems have considerable maintenance and repair costs. In addition, there are certain locations in the feedwater/steam circuit which have an increased concentration of the hydrogen, since a sufficient distribution of the hydrogen in the coolant is not ensured.

SUMMARY OF THE INVENTION

It is accordingly an object of the invention to provide a nuclear power station having a gas-injection device for a coolant, which overcomes the hereinafore-mentioned disadvantages of the heretofore-known devices of this general type, in which a feedwater/steam circuit is provided, in which a gas-injection device provided for introducing hydrogen into the coolant has especially low maintenance and repair costs and in which an especially homogeneous distribution of the hydrogen is ensured.

With the foregoing and other objects in view there is provided, in accordance with the invention, a nuclear power station, comprising a reactor pressure vessel; a feedwater/steam circuit connected to the reactor pressure vessel; a condensate-purification device and a feedwater pump connected in the feedwater/steam circuit upstream of the reactor pressure vessel; a branch line branching off from the feedwater/steam circuit directly downstream of the condensate-purification device and discharging into the feedwater/steam circuit directly upstream of the feedwater pump; and a gas-injection device connected in the branch line for introducing hydrogen into a coolant.

In this case, "directly" refers to the fact that the branching point is connected downstream of the condensate-purification device without further (active) components in between or the discharge point is connected upstream of the feedwater pump, its intake connection, or in the case of a plurality of feedwater pumps connected in parallel, their common suction line without further (active) components in between.

In this case, the invention is based on the concept that the maintenance and repair costs required for the gas-injection device may also be especially high due to contaminants in the coolant. In order to avoid such causes, such contaminants in the coolant should not pass into the gas-injection device. The gas-injection device should therefore be disposed at a location of the cooling circuit where the coolant has especially high purity. In addition, existing pressure conditions at certain locations of the cooling circuit should be utilized in order to avoid the installation of additional components, such as pumps, for example.

An especially homogeneous distribution of the hydrogen in the coolant should be ensured by a pump which produces a pressure increase in the coolant. In order to keep the technical outlay especially small in this case, a pump which is already provided in the feedwater/steam circuit should be used for this purpose. In order to simultaneously fulfill the conditions referred to, the condensate-purification device connected in the condensate line is connected upstream of the gas-injection device on the inlet side, and the feedwater pump connected upstream of the reactor pressure vessel is connected downstream of the gas-injection device on the outlet side.

In accordance with another feature of the invention, the gas-injection device has an electrolytic device (electrolyzer) for the decomposition of water into hydrogen and oxygen. In this case, the production of the hydrogen can be controlled in an especially simple manner by varying an electric current passed through the water.

In accordance with a further feature of the invention, the electrolytic unit has a number of diaphragm electrolytic cells. In such a diaphragm electrolytic cell, the operating principle of a fuel cell, as disclosed, for example, by an article entitled "Brennstoffzellen für Elektrotraktion" [Fuel Cells for Electric Traction], by K. Straszer, in VDI-Berichte, No. 912 (1992), page 125 and the following, is reversed. To this end, water is fed to a diaphragm disposed between an anode and a cathode. The water is decomposed electrolytically into hydrogen and oxygen by applying a supply voltage between the anode and the cathode. Such a diaphragm electrolytic cell is characterized by an especially compact type of construction, so that an electrolytic unit having a number of diaphragm electrolytic cells can be disposed in an especially confined space. Such an electrolytic unit can therefore be connected in the feedwater/steam circuit in an especially flexible manner and so as to be adapted to the specific requirements of the cooling circuit.

In accordance with an added feature of the invention, there is provided a pressure-control unit associated with the gas-injection device. This pressure-control unit maintains a lower pressure on the hydrogen side of the gas-injection device than on the oxygen side of the gas-injection device. Hydrogen is therefore prevented from being able to pass through the diaphragms of the diaphragm electrolytic cells to the oxygen side, in an especially reliable manner.

In accordance with an additional feature of the invention, the oxygen produced in the electrolytic unit is advantageously fed to an exhaust-gas system. If the exhaust-gas system is one which is associated with the coolant circuit, the oxygen can ensure a recombination of excess hydrogen there.

In accordance with a concomitant feature of the invention, the reactor pressure vessel is intended for boiling water.

The advantages achieved with the invention are in particular the fact that, due to the gas-injection device disposed in the feedwater/steam circuit, the hydrogen to be fed to the coolant can be produced in the immediate vicinity of the point at which it is fed into the feedwater/steam circuit. In this case, an especially homogeneous distribution of the hydrogen produced in the gas-injection device is ensured by the feedwater pump, which is already present in the feedwater/steam circuit and produces a pressure increase in the coolant. The gas-injection device therefore requires very little space and can be set up in a compact type of construction (modules) in the power house in an especially short assembly time. In addition, especially low maintenance and repair costs of the gas-injection device are ensured due to the fact that only purified condensed coolant is fed to the gas-injection device.

Other features which are considered as characteristic for the invention are set forth in the appended claims.

Although the invention is illustrated and described herein as embodied in a nuclear power station having a gas-injection device for a coolant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE of the drawing is a schematic and diagrammatic view of a nuclear power station according to the invention.

DESCRIPTION OF THE PREFERRED EMBODIMENTS

Referring now to the FIGURES of the drawings in detail and first, particularly, to FIG. 1 thereof, there is seen a nuclear power station 2 constructed as a boiling-water reactor plant which includes a cooling circuit in the form of a feedwater/steam circuit 4 with a condenser 6. In order to purify water or coolant K leaving the condenser 6, a condensate-purification device 12 is connected downstream of the condenser 6 on the outlet side through a condensate line 8, in which a condensate pump 10 is connected. The condensate-purification device 12 is connected through a line 14 to a feedwater pump 20 in the feedwater/steam circuit 4. A low-pressure preheater 16 and a feedwater tank 18 are connected in the line 14. The feedwater pump 20 has an outlet side which is connected through a line 22 having a high-pressure preheater 24 to a reactor pressure vessel 26 intended for boiling water. Two circulating pumps 28 are provided for circulation of the coolant K located in the reactor pressure vessel 26. In order to expand steam produced from the coolant K in the reactor pressure vessel 26, in such a way as to perform work, a high-pressure turbine 32 and a low-pressure turbine 34 are connected downstream of the reactor pressure vessel 26 through a line 30. The low-pressure turbine 34 has an outlet side connected through a line 36 to the condenser 6, so that a closed feedwater/steam circuit 4 is obtained.

In order to counter a radiolytic decomposition of the coolant K in the reactor pressure vessel 26, the feedwater/steam circuit 4 has a branch line 38 in which a gas-injection or hydrogen gassing device 40 is connected. The gas-injection device 40 includes an electrolytic unit 42, which is constructed as a diaphragm electrolyzer. This electrolytic unit 42 includes a number of diaphragm electrolytic cells 44, in which a diaphragm disposed between two electrodes acts as a solid electrolyte. The hydrogen production of such an electrolyzer can be controlled in an especially simple manner by varying the electric current being supplied. Such an electrolytic unit 42 has been disclosed, for example, in International Publication WO 97/36827.

In order to ensure that the gas-injection device 40 has especially low maintenance and repair costs, it is connected in the branch line 38, which branches off from the feedwater/steam circuit 4 directly downstream of the condensate-purification device 12 on the outlet side. In order to provide an especially homogeneous distribution of hydrogen W produced in the gas-injection device 40, the gas-injection device 40 is directly connected on its outlet side to the feedwater pump 20 through the branch line 38. Oxygen S produced in the gas-injection device 40 can be fed to the condenser 6 through a sectional or partial line 52. The condenser 6 is additionally connected through an exhaust-gas line 54 to an exhaust-gas system 56, which is connected to the environment through a stack 58 for drawing off exhaust gases A.

The gas-injection device 40 contains a pressure-control unit 60 in order to avoid a situation in which hydrogen W can pass through the diaphragms of the diaphragm electrolytic cells to the oxygen side. The pressure-control unit 60 ensures that a comparatively higher pressure prevails in the sectional line 52 than in the branch line 38, on the outlet side as viewed from the gas-injection device 40. To this end, the pressure-control unit 60 acts on the sectional line 52 and the branch line 38 connected downstream of the gas-injection device 40 with suitable devices, for example electrical devices or through the use of choke devices.

During operation of the nuclear power station 2, provision is made for introducing hydrogen W into the water or coolant K in order to prevent a radiolytic decomposition of the coolant K. For this purpose, coolant K leaving the condensate-purification device 12 is fed to the gas-injection device 40 through the branch line 38 at a purity of less than 1 $\mu$S/cm. The hydrogen W produced in the diaphragm electrolytic cells 44 is fed into the feedwater/steam circuit 4 on the inlet side upstream of the feedwater pump 20, for an especially homogeneous distribution of the hydrogen W in the feedwater/steam circuit 4. The oxygen S additionally produced in the gas-injection device 40 is fed through the line to the exhaust-gas system in order to recombine excess hydrogen W there.

The nuclear power station 2 which is constructed as a boiling-water reactor has the gas-injection device 40 for introducing hydrogen W into the coolant K conducted in the feedwater/steam circuit 4, in order to avoid corrosion (intergranular stress corrosion cracking IGSCC) in the reactor pressure vessel 26. Due to the especially high purity of the coolant K fed to the gas-injection device 40, the latter has especially low maintenance and repair costs. In addition, the feeding of the hydrogen W upstream of the feedwater pump 20 ensures an especially homogeneous distribution of the hydrogen W in the feedwater/steam circuit 4.

I claim:

1. A nuclear power station, comprising:
   a reactor pressure vessel;
   a feedwater/steam circuit connected to said reactor pressure vessel;
   a condensate-purification device and a feedwater pump connected in said feedwater/steam circuit upstream of said reactor pressure vessel;
   a branch line having an inlet branching off from said feedwater/steam circuit directly downstream of said condensate-purification device and an outlet, separate from said inlet, discharging into said feedwater/steam circuit directly upstream of said feedwater pump; and
   a gas-injection device connected in said branch line for introducing hydrogen into a coolant.

2. The nuclear power station according to claim 1, wherein said gas-injection device has an electrolytic unit for decomposition of a partial quantity of water conducted in said gas-injection device into hydrogen and oxygen.

3. The nuclear power station according to claim 2, wherein said electrolytic unit has a number of diaphragm electrolytic cells.

4. The nuclear power station according to claim 1, wherein said gas-injection device has a hydrogen side, an oxygen side and a pressure-control unit maintaining a lower pressure on said hydrogen side than on said oxygen side.

5. The nuclear power station according to claim 2, including an exhaust-gas system for receiving oxygen produced in said electrolytic unit.

6. The nuclear power station according to claim 1, wherein said reactor pressure vessel is a boiling water reactor pressure vessel.

7. A nuclear power station, comprising:
   a reactor pressure vessel;
   a feedwater/steam circuit connected to said reactor pressure vessel;
   a condensate-purification device having a downstream output and a feedwater pump having an upstream input connected in said feedwater/steam circuit upstream of said reactor pressure vessel; and
   a gas-injection device connected via an inlet to said downstream output of said condensate-purification device and via an outlet to said upstream input of said feedwater pump.

8. The nuclear power station according to claim 7, wherein said gas-injection device has an electrolytic unit for decomposition of a partial quantity of water conducted in said gas-injection device into hydrogen and oxygen.

9. The nuclear power station according to claim 8, wherein said electrolytic unit has a number of diaphragm electrolytic cells.

10. The nuclear power station according to claim 7, wherein said gas-injection device has a hydrogen side, an oxygen side and a pressure-control unit maintaining a lower pressure on said hydrogen side than on said oxygen side.

11. The nuclear power station according to claim 8, including an exhaust-gas system for receiving oxygen produced in said electrolytic unit.

12. The nuclear power station according to claim 7, wherein said reactor pressure vessel is a boiling water reactor pressure vessel.

13. The nuclear power station according to claim 7, wherein said gas-injection device is connected to said condensate-purification device and said feedwater pump via a branch line.

* * * * *